United States Patent [19]
Reinsch et al.

[11] Patent Number: 5,803,673
[45] Date of Patent: Sep. 8, 1998

[54] PORTABLE PNEUMATIC PRECISION METERING DEVICE

[75] Inventors: Frank G. Reinsch; Kevin Kwanghyon Park, both of Kansas City, Mo.

[73] Assignees: Pathfinder Systems, Inc.; Bayer Corporation, both of Kansas City, Mo.

[21] Appl. No.: 678,033

[22] Filed: Jul. 10, 1996

[51] Int. Cl.$^6$ ............................................. B65G 53/66
[52] U.S. Cl. ............................ 406/31; 406/38; 406/106; 406/128; 406/139; 406/173
[58] Field of Search ................ 406/38, 39, 106, 406/128, 139, 144, 173, 31, 29

[56] References Cited

U.S. PATENT DOCUMENTS

| | | | |
|---|---|---|---|
| 2,026,732 | 1/1936 | Farley | 406/144 |
| 2,572,862 | 10/1951 | Israel | 302/28 |
| 2,578,116 | 12/1951 | White et al. | 214/1.1 |
| 2,580,581 | 1/1952 | Niemitz | 302/28 |
| 2,596,824 | 5/1952 | Scott | 249/60 |
| 2,648,428 | 8/1953 | White et al. | 206/56 |
| 2,674,206 | 4/1954 | Scott | 105/369 |
| 3,030,153 | 4/1962 | Krenke et al. | 302/17 |
| 3,542,250 | 11/1970 | McRitchie | 406/39 |
| 3,694,037 | 9/1972 | Feder | 302/22 |
| 3,809,438 | 5/1974 | Hubbard | 302/22 |
| 4,571,143 | 2/1986 | Hellerich | 414/523 |
| 4,695,205 | 9/1987 | Levine | 406/38 |
| 4,793,743 | 12/1988 | Grodecki et al. | 406/123 |
| 4,834,586 | 5/1989 | Depew | 406/18 |
| 5,147,152 | 9/1992 | Link | 406/1 |
| 5,163,786 | 11/1992 | Christianson | 406/173 |

FOREIGN PATENT DOCUMENTS

| | | |
|---|---|---|
| 0 546 995 | 11/1985 | Australia . |
| 215893 | 6/1961 | Austria ................................. 406/128 |
| 92 01 539.5 | 6/1993 | Germany . |
| 583959 | 12/1977 | U.S.S.R. ............................... 406/106 |

OTHER PUBLICATIONS

"Seedvac Bulk Seed Conveyor", Pamphlet, 6 pgs., (Sep. 1996).

Primary Examiner—Gary C. Hoge
Attorney, Agent, or Firm—Fish & Richardson, P.C., P.A.

[57] ABSTRACT

The present invention is a device and method for the transportation and metering of precise amounts of particulate matter. The device provides an environmentally and operator safe means of transporting and dispensing precise amounts of particulate matter from the point of manufacture directly to the ultimate consumer of the product. Because of the unique design, the device is readily transportable via standard means of transportation and may be operated by a single individual with no environmental or operator risk. The device further contains, as an integral part thereof, means for the precision metering of the particulate matter being transported. The device may be utilized to store the particulate matter for extended periods of time and, upon being emptied, may be refilled and reused.

15 Claims, 3 Drawing Sheets

PORTABLE PNEUMATIC PRECISION METERING DEVICE

FIELD OF THE INVENTION

This invention generally relates to a device and method for shipping and dispensing precise amounts of particulate matter. In particular, this invention relates to a device and method for shipping and dispensing fertilizer, herbicide and pesticide products in dry or granular form. It is to be understood that the word particulate as used herein is to include any type of granular or powdered materials as well as mixtures thereof.

BACKGROUND OF THE INVENTION

Numerous devices exist for the shipping or transport of particulate matter. These devices generally involve a shipping container constructed of steel, aluminum, stainless steel, plastic or a similar material which is shaped and sized to provide for ease of stacking and mobility while providing sufficient strength and durability to ensure reliable and safe transportation of the material being shipped. Such a container is described in U.S. Pat. No. 2,648,428 issued to F. J. White et al ("White No. 1").

In designing the various shipping containers, such as the one discussed in White No. 1, the primary design considerations have been to: (1) reduce the weight and costs of the component materials, thereby reducing both initial manufacturing costs and the costs associated with each shipment of the container, and (2) optimize the shipping container's size and stackability relative to existing methods of transportation and storage, to maximize ease of handling and stacking of the container while it is being shipped and stored. Generally, the containers were designed to be shipped to a storage location or plant having means for unloading the shipping container.

Also in existence are numerous examples of stationary, fixed devices designed to unload particulate matter from shipping containers and to transport that particulate matter throughout a factory or the like. U.S. Pat. No. 2,578,116 issued to F. J. White et al. ("White No. 2") teaches a tilting and unloading device for bins and receptacles of the type disclosed in White No. 1. The tilting and unloading device is a separate stand-alone device which exists apart from the bin or receptacle to be unloaded and which provides a means to unload the particulate matter being transported in the bin or receptacle.

U.S. Pat. No. 4,695,205 issued to Levine shows a closed loop method and apparatus for unloading particulate materials from a transport container into a supply bin. Levine teaches a fixed or stationary apparatus of the type which would be found in a grain elevator or similar facility receiving dry granular material. Similarly, U.S. Pat. No. 2,572,862 issued to J. J. Israel shows a system for handling flour or the like in a processing plant such as a bakery. The system receives the flour in bulk from railway cars or trucks and then conveys the flour throughout the plant to various bins.

U.S. Pat. No. 5,147,152 issued to Link teaches a suction conveyor or delivery arrangement for the gravimetric allocation of pourable material components to various demand stations from one or more storage containers containing, in each case, one component connected by, in each case, one delivery line to a distributor and separator at each demand station. The device of Link allows for a gravimetric precision dosing of material components to various demand stations throughout a processing plant, such as a plastic processing plant.

U.S. Pat. No. 3,694,037 issued to Feder teaches a pneumatic conveyance system for the conveyance of materials, such as finely divided solids, from a railroad hopper car to a storage container therefor within a manufacturing plant. U.S. Pat. No. 3,809,438 issued to Hubbard similarly shows a pneumatic conveying system for particulate materials which uses a multi-stage centrifugal fan energizer wherein the first stage has stationary blades of lesser diameter than the impeller, and a vented shroud. Major separation of dry materials being conveyed by the pneumatic conveying stream is effected in a cyclone separator of the known variety. U.S. Pat. No. 4,834,586 issued to Depew shows an apparatus for moving particulate material from a first level to a higher second level using air entrained to move in a loop.

Fundamental to each of these pneumatic conveying apparatuses designed for the unloading of shipping containers or the like is that they are stationary and fixed in a given location. The particulate matter is used in the plant or, in other instances where the plant served as a central distribution point for consumers of the particulate matter, such as in the case of a grain elevator or chemical distribution plant, the consumer of the particulate matter would travel to the plant each time he or she needed any amount of the particulate matter and the product would be dispensed directly into whatever type of ultimate distribution vehicle the consumer was utilizing to apply the product as he or she desired. In many instances, this vehicle would be a chemical spray truck utilized by a farmer to spray crops.

In the case of most fertilizer, pesticide and herbicide products, the product is applied as a liquid, and the mixture must be transported as a liquid in the spray truck. Normally, a desired amount of the dry product is metered into the farmer's spray truck or the like by a distribution system at the plant. At the time the dry product is added to the spray truck it is mixed with water to form the chemical mixture which will be applied to the desired field or the like. A major drawback of this type of system is that environmental and safety regulations regulating the transport of liquid chemical mixtures are more stringent—and therefore more costly to comply with—than those governing the transport of dry chemical mixtures. These environmental and safety regulations are much more onerous than those directed to the transportation of particulate of the same type in a dry form. A second drawback of this type of system is that each time the farmer wishes to apply chemicals, he or she must travel from the location where the chemicals will be applied to a central distribution point for the dry product.

The prior art does not teach any type of shipping container which can transport particulate matter such as, by way of example, fertilizers, herbicides, or pesticides, in a dry form directly to the ultimate distribution vehicle which a farmer uses to apply those chemicals to a field, such as a chemical spray truck or any of a variety of towed farm implements used to apply chemicals. The prior art also does not teach a shipping container which can readily and easily be placed in the back of a vehicle such as a pickup truck and taken by a farmer or the like to the farm and then can be used as desired over a long period of time to dispense precise amounts of the particulate matter as needed directly to the ultimate distribution vehicle.

It is therefore a primary object of the present invention to provide a shipping container for particulate matter such as dry or granular powdered materials which contains as an integral component of the shipping container a means for dispensing a precise amount of the particulate matter being shipped.

It is a further object of the present invention to provide a shipping container for hazardous products such as fertilizers, herbicides or pesticides and the like which meets all applicable environmental and regulatory standards and which allows the particulate matter being transported to be transported directly to the ultimate consumer in a dry form.

It is a further object of the present invention to provide a durable, stackable shipping container containing means for dispensing a precise amount of the particulate matter being transported which may be readily transported on standard transportation means such as rail cars, flatbed trucks, and in a common pickup truck or a similar such vehicle.

It is a further object of the present invention to provide a storage device for various herbicides, fertilizers and pesticides which may be transported to a farm or the like and which may safely store such products for an extended period of time thereby allowing the ultimate consumer to utilize desired amounts of the product as needed.

It is a further object of the present invention to provide a low-cost and easily manufactured shipping container, containing means for dispensing a desired amount of the particulate matter being transported.

It is a further object of the present invention to provide a portable, reusable and refillable shipping container containing as an integral component thereof, a means for dispensing a precise amount of particulate matter.

It is a further object of the present invention to provide a method of safely transporting dry particulate matter such as fertilizer, herbicide, pesticide, or other hazardous dry materials from a manufacturer directly to the ultimate user, and to further provide the means for the ultimate user to store such particulate matter for an extended period of time and to safely and efficiently dispense desired amounts of the particulate matter as needed.

SUMMARY OF THE INVENTION

The foregoing objects, as well as additional objects, are accomplished by the present invention wherein briefly and generally, the present invention provides a device which can be utilized to ship particulate matter from a manufacturer of the particulate matter directly to an end user of the product. The device further contains as an integral part thereof, means for the precision metering of the particulate matter being transported.

A primary feature of the present invention is to provide a shipping container for particulate matter, and especially particulate matter of a hazardous nature, which provides for an environmentally safe means for transporting the particulate matter as well as an environmentally and operator safe means of dispensing precise amounts of the particulate matter.

It is a further feature of the present invention that the device may be repeatedly filled with particulate matter and then may be repeatedly sealed so as to provide a leakproof/vaporproof/hermetic seal thereby allowing extended storage of the particulate matter in the device in all weather conditions for extended periods of time.

It is a further feature of the present invention that it may be easily stored and transported. A technical advantage of the present invention is that it is sized such that the number of units which can be placed on a railcar or a flatbed semi is maximized. Further features of the invention which enhance the shipping ease include stacking guides located on the top of each unit, as well as lifting lugs also located on the top of each unit. The invention is constructed such that it may be stackable up to three high while in storage. It is yet another feature of the invention that the device allows for four-way fork lift entry.

It is yet another feature of the invention that it contains metering means which operate in conjunction with a pneumatic conveying means in a separator means to dispense precise amounts of the particulate matter being stored. Further, it is an additional feature that the device may be transported to the ultimate end user, such as the farmer in the field, where the particulate matter may be dispensed directly into a vehicle which is used to apply the chemical to the field.

A further significant advantage of the present invention is that the particulate may be transported and handled in a dry form, whereas currently existing systems for transporting herbicides, pesticides and the like require that they be transported in a wet form to the end user. Transportation in dry form allows the product to be classified in a lower handling status as well as allowing more product to be transported in less volume.

Other and further objects, features and advantages of the various aspects of the present invention will become apparent from the following description of its preferred various embodiments, which description is given for the purpose of disclosure and which should be taken in conjunction with the accompanying drawings.

DESCRIPTION OF THE DRAWINGS

FIG. 4 is a vertical cross-sectional view of the separator means.

FIG. 5 is a side elevational view of the separator means.

DETAILED DESCRIPTION OF THE INVENTION

Figure 1:
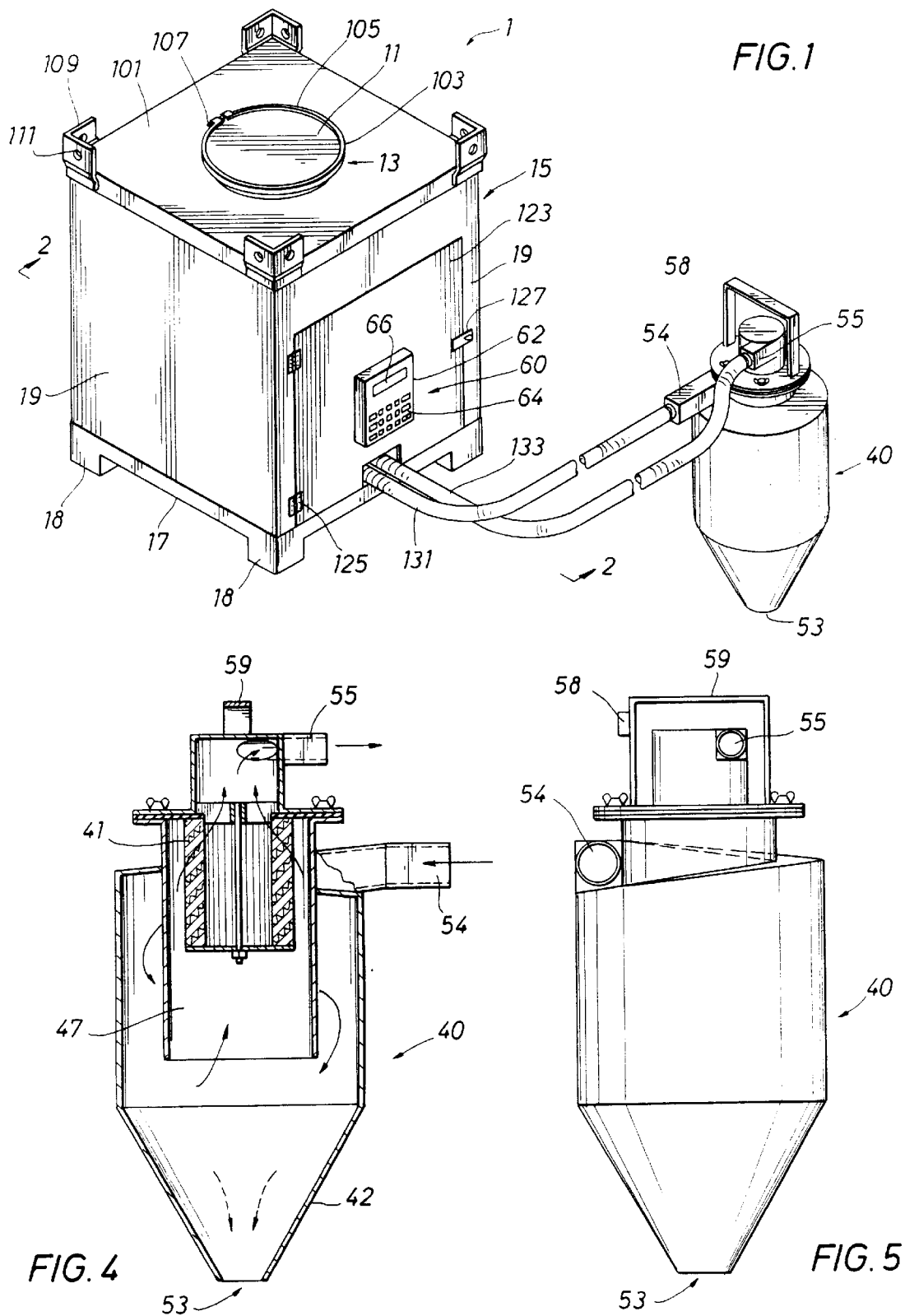
FIG. 1 is an overall perspective view of the present invention.

A device for transporting and metering of particulate matter is shown generally in FIG. 1 by the reference numeral 1. Because it is envisioned that this invention will have a particular applicability in the transportation, storage and dispensing of fertilizers, herbicides and pesticides which are used in the agricultural industry, the description of the invention will often reference its application in those areas; however, it is to be realized that the present device and method is designed to transport, store and dispense any type of particulate matter and its scope and the appended claims encompass all such applications and the present invention is not in any way limited to the transportation of only fertilizers, herbicides, or pesticides.

Figure 2:
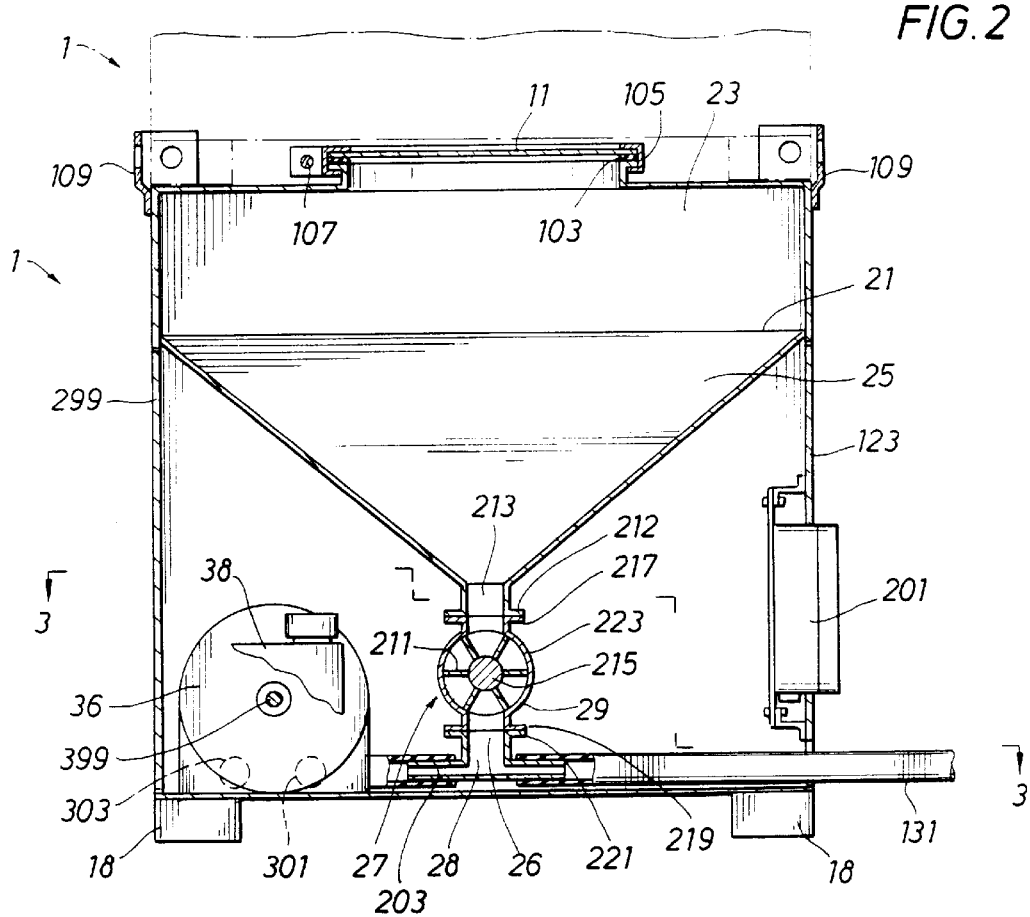
FIG. 2 is a vertical cross-section partially in cutaway taken along the line 2—2 of FIG. 1.

As shown in FIG. 1, the device includes an outer enclosure means 15, preferably aluminum, which is shaped to maximize the number of units which may be stacked and stored in a given space. According to one preferred embodiment, the base 17 of the enclosure means 15 has dimensions of 42"×48". Constructing the base 17 to these dimensions maximizes the number of units which may be transported on a standard 40' flatbed truck. The height of device 1 may be varied depending on the desired volume of the storage means 21 as shown in FIG. 2. The storage means 21 may be any structure capable of storing particulate matter, such as a hopper, bin or other suitably shaped container which will fit within the enclosure means 15. In a preferred embodiment, the device 1 has an overall height of 48.5". A device 1 of this height will have a storage means 21 which has a total volume of 19.8 ft$^3$, of which 14.5 ft$^3$ is generally utilized thereby giving the device 1 a loaded weight of 500 lbs. In other embodiments, the device 1 may have a height of 60.5" allowing for a total storage volume of 44.3 ft$^3$, or a height of 83.5" allowing for a total storage volume of 70 ft$^3$.

The base 17 is preferably constructed of 0.250" aluminum. The base 17 may be constructed so as to include an X-shaped crimp therein to increase strength and rigidity. The base 17 may also include a drain hole therein to allow fluids to drain out of the enclosure means 15. The base 17 includes four legs 18 located at each of the corners of the base 17. The legs 18 extend downwardly from the base 17 and are sized so as to snugly fit inside the stacking pads 109 of another unit 1. The legs 18 are of sufficient length so that when one unit 1 is placed upon a second unit 1, the base 17 of the upper unit 1 will not impinge upon the closing means 13 of the lower unit. An important feature of the present invention is that the base 17 and legs 18 are constructed to allow a forklift to enter and pickup the unit from any side. Additionally, the base 17 provides substantial wear resistance against the tines of a fork lift which will frequently engage the base 17.

The side walls 19 may be formed of a continuous material, preferably aluminum, and the lower edge portions thereof are preferably welded to the base 17. In one embodiment, the side walls 18 are formed from two pieces of material and are welded together at two vertical seams. The base 17 may be stamped from one piece of material and similarly, the side walls 19 as well as the top 101 may be stamped from a single piece of material. In a preferred embodiment, the side walls 19 are formed from a 36" tall sheet of material. Both front and rear door openings may be formed in the side walls 18. A front door 123, preferably constructed of aluminum, is attached to the side wall 19 by hinges 125. The front door 123 includes an opening which contains a control box 62 as well as a second opening to allow a particulate matter conduit 131 and a pneumatic gas return conduit 133 to enter the internal confines of the enclosure means 15. A lock or latch 127 may be included to lock the front door 123 in a closed position to secure the components contained within the enclosure means 15. As shown in FIG. 2, a rear door 299 is attached, via a similar hinge and locking mechanism as that utilized on the front door 123, at the rear of the unit. A portion of the rear door 299 may include a grating which allows the gas engine 38 to breathe while in operation.

The top 101 is welded to the side walls 19. The top 101 contains therein an opening which may be sealed by closing means 13. The closing means 13 include a cover 11. In the preferred embodiment, the opening is a standard drum size opening of 22.5" diameter. The opening is formed to include an extruded neck portion which allows for a cover 11 to be placed over the opening. A rubber gasket 103 surrounds the outer circumference of the opening to provide an air-tight seal about the opening. A metal clamp ring 105 fits around the outer circumference of the cover 11, and can be tightened by a tightening bolt 107 to tightly seal the opening. The cover 11, rubber gasket 103, and clamp ring 105 provide a leakproof/vaporproof/hermetic seal which secures the particulate matter being transported or stored inside the storage means 21 and prevents individuals coming into contact with the device 1 from being exposed to the particulate matter. The opening is sealed such that the container meets all presently existing safety, environmental and regulatory standards under which shipping containers for particulate matter such as fertilizers, herbicides, or pesticides must presently comply. It is to be understood that other closing means may be utilized as long as they meet the applicable safety, environmental and regulatory standards. Stacking guides 109 may be mounted at each corner of a unit in such a fashion as to allow one unit to be securely placed on top of another unit. Each stacking guide 109 is formed to include an opening therein referred to as a lifting lug 111.

FIG. 1 also depicts the particulate matter conduit 131 which provides a means for transporting particulate matter entrained in a pneumatic gas stream to a separator means shown generally by the reference numeral 40 (FIGS. 1, 3, 4 and 5). In a preferred embodiment, the separator means 40 is a cyclone separator. The cyclone separator 40 separates the particulate matter from the pneumatic gas in which the particulate matter is entrained. The separated particulate matter is dispensed from the cyclone separator 40 through an opening 53 located in the bottom of the cyclone separator 40. The pneumatic gas is then returned through a pneumatic gas return conduit 133. During shipping and, if desired, during periods of storage of the unit 1, the conduits, 131 and 133, and the separator means 40, are contained within the enclosure means 15. Any suitable type of cyclone separator may be used which incorporates a standard cyclonic design.

As shown in FIG. 2, the storage means 21 is located within the enclosure means 15 of the device 1. The storage means 21 includes a generally square upper portion 23 and a tapered lower portion 25. In one embodiment, the storage means 21 is constructed of aluminum. Alternatively, the storage means 21 may be constructed of plastic, stainless steel, carbon steel or other materials having similar characteristics. The tapered lower portion 25 preferably exhibits a 45° angle of decline to ensure proper flow of particulate matter to a metering means shown generally by the reference numeral 27.

In a preferred embodiment, the storage means 21 has a total volume of 19.8 ft$^3$. In a second embodiment the storage means 21 has a total volume of 44.3 ft$^3$. In yet another embodiment, the storage means 21 has a volume of 70 ft$^3$. Each of these various embodiments can be built upon the standard 42"×48"base. The storage means 21 is constructed so as to meet all current United States Department of Transportation requirements for tank design.

The metering means 27 is depicted in FIG. 2. The metering means 27 is connected to the lower portion 25 of the storage means 21. In operation, the metering means 27 meters a desired amount of particulate matter from the storage means 21 to a pick-up shoe 28 which is connected in-line with the particulate matter conduit 131.

In a preferred embodiment, the metering means 27 includes an air lock 29. The air lock 29 includes a plurality of vanes 211 located within the air lock housing 223. A rotor 215 exhibiting a plurality of vanes 211 is located within the air lock housing 223. Preferably, the rotor 215 has a diameter of about 4" and six vanes are used. The air lock 29 has an upper flange 217 which is bolted to a corresponding flange 212 on the bottom of the storage means 21 by a plurality of bolts and a lower flange 219 which is bolted to a corresponding flange 221 on a pick-up shoe 28. According to a preferred embodiment, the air lock 29 has a calculated volume of 0.020 ft$^3$/revolution and is designed to operate at approximately 20 RPM. It is to be understood that one of skill in the art would readily recognize that various other air locks of similar size and performance may be utilized.

Figure 3:
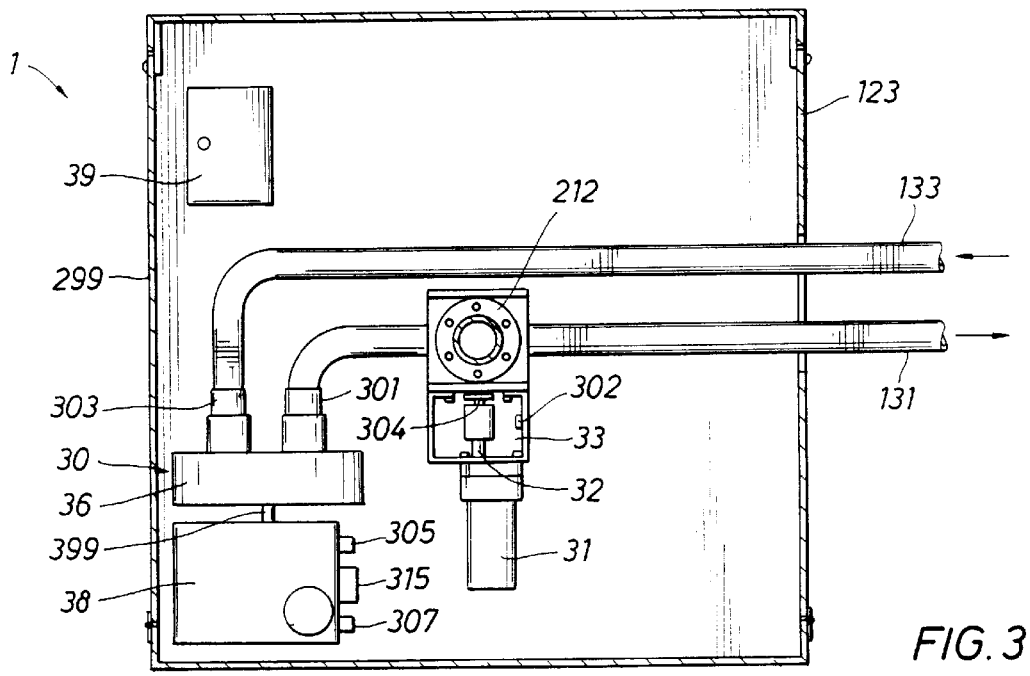
FIG. 3 is a cross-sectional view taken along the line 3—3 of FIG. 2.

The air lock 29 is operated by an air lock electrical drive motor 31 as shown in FIG. 3. A magnetic proximity switch 302 provides feedback to the control box 62 for measuring the amount of particulate matter dispensed. A sprocket 304 on the air lock drive motor shaft 32 triggers the proximity switch 302 off and on. A motor mounting plate 33 connects the air lock drive motor 31 to the air lock 29 as depicted in FIG. 3. Air lock drive motor shaft 32 transfers the rotation of the air lock drive motor 31 to the air lock 29. In a preferred embodiment, the air lock drive motor 31 is a 12 volt DC, 1/20 hp electric motor, which operates at approximately 20 RPM when supplied with a current of 3.5 amps. One satisfactory type electric motor 31 is model No. 100 DC made by Bison. It is to be understood that one of skill in the art would readily recognize that various other electric motors of similar size and performance may be utilized.

The pick-up shoe 28 is mated to a lower flange 219 of the air lock 29 by flange 221. In a preferred embodiment, the pick-up shoe transitions into a carbon steel tube 203 connected in-line with the particulate matter conduit 131.

FIG. 3 shows a pneumatic conveying means shown generally by the reference numeral 30, which includes a blower 36, a particulate matter conduit 131, a pneumatic gas return conduit 133, and motor 38 for driving the blower 36. According to one preferred embodiment, the pneumatic conveying means 30 functions in conjunction with the cyclone separator 40 to form a closed loop system for discharging the particulate matter. Because the system is a closed loop system, the individual dispensing the particulate matter is not exposed to the material or to any dust generated by the pneumatic conveying means. In situations where toxic products such as fertilizers, herbicides and pesticides are being dispensed this is an important benefit of the present invention.

The blower 36 is preferably a regenerative blower which will circulate a pneumatic gas stream in a continuous loop. The blower 36 will preferably produce 38" W.C. at 32 CFM while operating at 3600 RPM. One satisfactory type blower is a model SDR4 made by GAST. It is to be understood that one of ordinary skill in the art would readily recognize that various other blowers of similar size and performance may be utilized.

The blower 36 has an outlet 301 which is connected to the particulate matter conduit 131. The particulate matter conduit 131 is connected in-line with the pick-up shoe 28 and extends outside of the enclosure means 15 to the cyclone separator 40. As is shown in FIG. 1, the particulate matter conduit 131 is connected to the cyclone separator 40 at inlet 54. After the cyclone separator 40 removes the particulate matter from the pneumatic gas, the pneumatic gas exits the cyclone separator 40 at outlet 55 and is then returned to the blower 36 through pneumatic gas return conduit 133. Pneumatic gas return conduit 133 is connected to blower inlet 303, as is shown in FIG. 3. The conduits, 131 and 133, may be formed of any of a variety of flexible hoses. The length of the conduits, 131 and 133, is generally on the order of 20', but may be extended up to any length as is desired in order to facilitate the dispensing of particulate matter from the cyclone separator 40 as needed.

As shown in FIG. 3, the blower 36 is driven by a motor 38. The motor 38 is connected to the blower 36 by shaft 399. The motor 38 is an electric starting gas engine which drives the pneumatic conveying means 30 and, while running, also drives an alternator 315 which provides power for charging a battery 39. An integral electric starter solenoid 305 and choke solenoid 307 allow for remote starting of the motor 38. The P-lead 622 off the magneto is brought out through a connector to allow for remote shut down of the engine. The controller means 60 through the control box 62 allows for user input to start and stop the motor 38 and dispense the desired amount of particulate matter. Preferably, at 3600 RPM, the motor preferably provides 5 hp and 7.4 foot pounds. At 2800 rpm the motor provides 3.9 hp and 7.4 foot pounds. One suitable motor 38 is model no. 205012 made by Tecumesch.

A charging battery 39 provides electric power to drive the air lock drive motor 31, as well as providing a power source for the control box 62. The battery 39 is charged by alternator 315 when the engine 38 is running. Both the battery 39 and starter solenoid 305 are mounted in a splash resistant housing to protect them from water spray. In the preferred embodiment, automotive type GPT electrical wiring connects all components of the controller means 60 together through a water type connection system.

As shown in FIG. 4, the separator means 40 is of a cyclonic design and will be referred to as both the separator means or cyclone separator 40. Inlet 54 is connected to particulate matter conduit 131 and receives particulate matter entrained in the pneumatic gas. The inlet 54 leads to a first substantially tangential material inlet in the side of the cyclone separator 40 so that a centrifugal spin is imparted to the particulate matter in the pneumatic gas as it enters the cyclone separator 40 from particulate matter conduit 131. As the particulate matter is spinning inside the cyclone separator 40, centrifugal force holds it against the outer walls of the cyclone separator 40 while gravity causes the particulate matter to fall downwardly in the cyclone separator 40 until eventually it passes from an opening 53 into a desired receiving apparatus. In a preferred embodiment, the cyclone separator 40 is a 7" main cyclone which ensures a minimum of 7 complete revolutions of the pneumatic gas before a cyclone separator hopper 42 begins. The cyclone separator hopper 42 may preferably exhibit a 70° angle of decline which ensures higher efficiency on smaller particulate matter particle sizes, particularly, those approaching the 3 to 5 micron range. The pneumatic gas eventually flows up a return channel 47 to an outlet 55 and then through the pneumatic gas return conduit 133 to the blower 36. A filter 41 is located in the return channel for removal of dust and particulates prior to recirculation of the pneumatic gas through the pneumatic gas return conduit 133. The separator means 40 further exhibits a handle 59 to assist in movement and control of the separator means 40. One satisfactory type separator means 40 is model No. 7-F made by Pathfinder Systems Incorporated. It is to be understood that one of skill in the art would readily recognize that various other separator means 40 of similar size and performance may be utilized.

Figure 6:
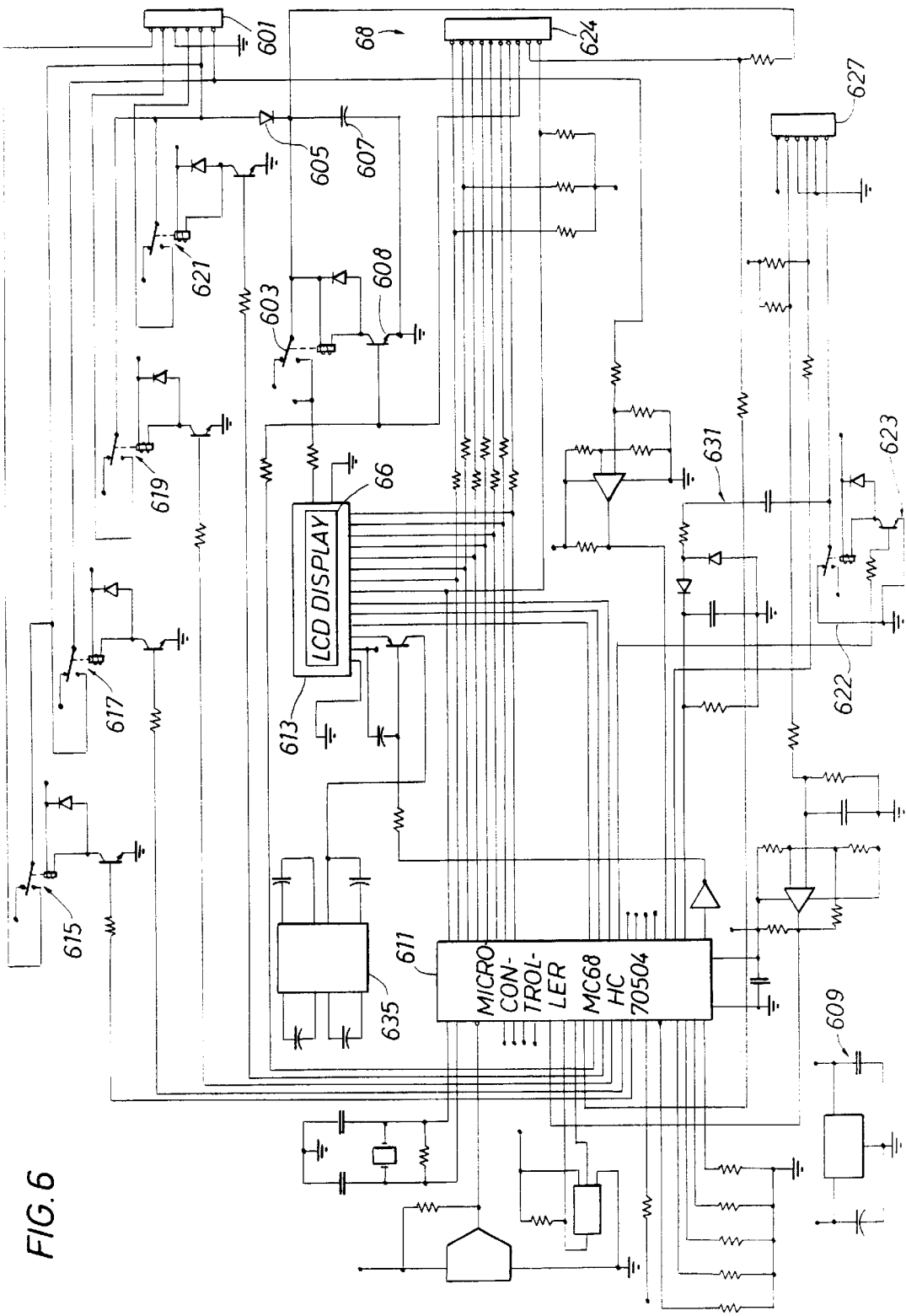
FIG. 6 is a schematic view of the control box circuit of the controller means.

Various types of controllers may be used. In a preferred embodiment, as shown in FIG. 6, control box 62 contains therein a circuit referred to generally by the reference numeral 68. It is to be understood that the various component values are design choices which would be readily apparent to one of ordinary skill in the art.

The control box circuit 68 is connected to the battery 39 through junction panel 601. The line feeding the power relay 603 is filtered through diode 605 and capacitor 607. The ON/OFF switch on the keypad 64 allows for activation of power relay 603 through transistor 608. Once the power relay 603 is turned on, the voltage regulator 609 provides 5 volts for the MC68HC705C4 microcontroller 611. The microcontroller 611 powers up to hold the power relay 603 turned on and thereby latching the circuit on. The microcontroller 611 holds the power relay 603 in until the system requires a shut down.

The LCD display 66 is a 16X2 LCD with back light display 613 which provides the user with visual information about the status and sequence of operation. Choke relay 615 provides power for engaging the choke solenoid 307. The charge relay 617 is used to connect the alternator 315 to the 12 volt power line for charging of the 12 volt battery 39 while the engine 38 is running. Starter relay 619 is used to power the starter solenoid 305 used in starting the engine 38. Motor relay 621 drives the air lock drive motor 31 for dispensing particulate matter. P-lead relay 623 is used to short out the P-lead 622 from the engine 38 to disable the ignition system and shut the engine 38 down.

The keypad 64 attaches through junction panel 624 and provides most all of the user input. The separator means 40 includes a START/STOP switch 58. When the separator means 40 is in a desired location the START/STOP switch 58 activates the metering means 27. The START/STOP switch enters on junction panel 627 and accounts for the remaining user input. The proximity switch signal is brought in through junction panel 627 and cleaned up by a Schmidt trigger circuit. The P-lead 622 from the engine 38 is also used to provide information on the status of the engine 38. When the engine 38 is running, the P-lead 622 contains high voltage pulses which are used to produce a dc voltage through the charge pump circuit 631.

The microcontroller 611 communicates with a X24C01 serial EEPROM to load and download the inventory, contrast setting, and calibration numbers which are user programmed into the control box 62. The RS232 chip 635 provides voltage levels used by the LCD display 66 for contrast adjustment and provides for possible communication with other components through an RS232 type interface.

The method of transporting, storing and dispensing desired amounts of particulate matter using the invention will now be described. The unit 1 is initially filled with a desired amount of particulate matter at the point of manufacture of whatever type of particulate matter is being transported, or at a warehouse or similar bulk storage facility. In many cases, this will be a fertilizer, herbicide or pesticide manufacturing plant or bulk storage facility. At the time the unit 1 is being filled, an individual will power up the control box 62 through an ON/OFF button located on the keypad 64. In normal operation, the control box 62 is programmed to accept two passwords, one that would be used by a user in the field for initiating a dispensing cycle in the field and which is commonly referred to as the "field password," and a second password that is used by the individual filling the machine, entering the amounts of material loaded, and for calibration factors, and which is commonly referred to as the "filling password." Once a correct password is keyed in, the user must press the ENTER button for the unit to acknowledge the entry and advance to the proper area.

When the system is started by pressing the ON/OFF button on keypad 64, the LCD display 66 will display the current inventory amount in the upper left corner and displaying "PASSWORD" on the right hand side of the readout. From this point on, the user has the ability to adjust the contrast of the LCD display 66 for ideal viewing by performing the following: to increase the amount of contrast—press and hold the STOP button and while doing so press and release the RESET button several times to increase the contrast of the LCD display 66; to decrease the amount of contrast—perform the previous function, but use the ENTER button instead of the RESET button.

If the user enters the filling password in the password menu, the control box 62 advances into the warehouse menu. At this point the inventory amount can be changed by pressing the RESET button which clears any amount which was shown in inventory. A new value can be entered into inventory by keying in the new value and pressing the ENTER button. Pressing the ENTER button again will advance the unit to the calibration menu. In this menu, the user can enter in a number which relates to how many pounds of particulate matter per pulse the unit 1 will dispense. To change this number, the user keys in the new value and presses the ENTER button. After a new number is entered, pressing the ENTER button loops the control back to the initial password menu.

The storage means 21 is filled through the opening in the top 101 of the enclosure means 15. The opening is a standard drum size of 22.5" which facilitates filling of the storage means 21. Once the storage means 21 is filled to a desired amount, the storage means 21 is sealed by the closing means 13. During shipping, the unit 1 is configured so that the conduits, 131 and 133, and the separator means 40, are contained within the enclosure means of the unit 1.

The unit 1 is designed to be handled by a forklift and also includes lifting lugs 111 to facilitate handling of the unit 1. The dimensions of the unit 1 are configured to maximize the number of units which may be loaded on a railcar or a flatbed truck. Additionally, the unit 1 is also sized so that it may be readily placed in the back of a standard pick-up truck.

In the typical operation, an end user of the particulate matter would transport the unit 1 directly from a manufacturing facility or bulk storage facility to a location where it was desired to use the particulate matter. In many instances, and especially in the agriculture industry, this location is in the field where the chemicals are to be applied. The present invention thus allows the farmer to eliminate repeated trips to a bulk storage facility with his or her spray vehicle.

If the field password is entered, the LCD display 66 advances to the start engine display. The LCD display 66 displays "START ENGINE" on the right hand side and the unit is waiting for the user to start the engine 38. A choke button on the keypad 64 is used to toggle the choke solenoid 307 on and off. The readout will display the word "choke" to show the status of the choke solenoid 307. The START ENGINE button engages the starter solenoid 305 to crank the engine 38 for starting. Once the engine 38 is operating, the control box 62 automatically advances to the next menu, disabling the choke solenoid 307, if it was activated. The LCD display 66 now displays the inventory amount in the upper left, the running total in the upper right, and the input total in the lower right. When entering the above menu, the running total and input total default to zero.

To dispense particulate matter from the unit 1, the user must enter a desired amount of particulate matter to be dispensed on the keypad 64 and press the ENTER button. To engage the air lock drive motor 31 and dispense the desired amount of particulate matter, the user must press the START/STOP switch 58 on the separator means 40. The running total will count up with the actual amount of particulate matter being dispensed while the inventory will count down, keeping track of the remaining amount of particulate matter in the unit 1. Once the running total equals the input total the air lock drive motor 31 is shut down and the cycle is complete. If necessary, the user may stop the dispensing process in the middle of a cycle by pressing either the STOP button on the keypad 64 or the START/STOP switch 58 on the separator means 40. Once stopped, pressing the START/STOP switch 58 on the separator means 40 again will start the cycle from the point it was previously interrupted and maintain all particulate matter counts. To cancel a cycle in the middle, the user must stop the dispensing process as described above, and then press the RESET button once to clear the running total. At this point, the user can start a new cycle using the existing input total, or he or she can clear the current input total by pressing the reset button again and then entering a new input total. If the user is performing multiple dispensing cycles of the same amount, he can press the START/STOP switch 58 on the separator means 40 at the end of a cycle to reset the running total and automatically start a new cycle. The user is allowed to enter less than or equal to the amount remaining in inventory. If a larger amount is keyed in, it will change to the amount in inventory once the ENTER button is pressed. At any time the user may power down the control box 62 by pressing the ON/OFF button.

It is to be understood that a major feature of the present invention is that the unit 1 may be returned to the manufacturing facility or bulk storage facility and refilled. A user may choose to acquire a unit 1 and return on an as needed basis to have the unit refilled. Because the unit 1 allows for extended storage of the particulate matter in all weather conditions, the user can store the unit 1 at a desired location and, thus, have on hand a supply of particulate matter to use as needed, while at the same time complying with all applicable safety, environmental and regulatory provisions. Because the unit 1 is easily transportable it is well within the realm of the average user to transport the unit 1 to and from a refill facility.

The present invention, therefore, is well adapted to carry out the objects and attain the ends and advantages mentioned as well as others inherent therein. While a presently preferred embodiment of the invention has been given for the purpose of disclosure, numerous changes in the details of construction, arrangement of parts, and steps of the process may be made without departing from the spirit of the invention and the scope of the appended claims.

We claim:

1. A device for transporting and metering of particulate matter, comprising:

storage means for storing said particulate matter during the transport of the device and prior to the use of some or all of the particulate matter;

metering means connected to said storage means for dispensing a desired amount of particulate matter from said storage means;

pneumatic conveying means connected to said metering means for transporting a mixture of a pneumatic gas and said particulate matter from said metering means to a separator means downstream of said metering means;

said separator means having an inlet for receiving said mixture of pneumatic gas and said particulate matter, a particulate matter outlet for discharging said particulate matter, and a pneumatic gas return outlet for returning said pneumatic gas to said pneumatic conveying means after said particulate matter has been discharged; and portable enclosure means encasing at least said storage means and said metering means.

2. The device of claim 1, wherein said particulate matter storage means comprises a downwardly directed hopper.

3. The device of claim 2, wherein said hopper has a forty-five degree angle of decline.

4. The device of claim 2, wherein said hopper is constructed of material selected from the group consisting of aluminum, plastic, stainless steel and carbon steel.

5. The device of claim 2, wherein said hopper has an opening in the top thereof for filling said hopper with particulate matter.

6. The device of claim 5, further comprising means for hermetically sealing the opening in said hopper.

7. The device of claim 1, wherein said metering means comprises:

an airlock, including a metering rotor;

an airlock drive motor for rotatably driving said metering rotor; and controller means for controlling the output of said airlock drive motor.

8. The device of claim 7, wherein said airlock drive motor comprises a direct current electric motor.

9. The device of claim 1, wherein said pneumatic conveying means comprises:

a blower upstream of said metering means;

a particulate matter conduit connecting said blower to said metering means and further connecting said metering means to the inlet of said separator means; and a pneumatic gas return conduit connecting the pneumatic gas return outlet of said separator means to said blower.

10. The device of claim 9, further comprising a motor for driving said blower.

11. The device of claim 10, further comprising:

a battery for supplying electrical power;

a battery charger connected to and driven by said motor;

an air lock drive motor connected to the battery for receiving power therefrom and connected to and driving the metering means; and means positioned adjacent said metering means for measuring the amount of material dispensed.

12. The device of claim 11, further comprising controller means for controlling said motor.

13. The device of claim 1, wherein said separator means comprises a cyclone and said cyclone includes an integral dust filter.

14. A device for transporting and metering of particulate matter, comprising:

storage means for storing said particulate matter;

metering means connected to said storage means for dispensing a desired amount of particulate matter from said storage means;

pneumatic conveying means connected to said metering means for transporting a mixture of a pneumatic gas and said particulate matter from said metering means to a separator means downstream of said metering means;

said pneumatic conveying means comprising:

a blower upstream of said metering means;

a motor for driving said blower;

a particulate matter conduit connecting said blower to said metering means and further connecting said metering means to the inlet of said separator means; and a pneumatic gas return conduit connecting the pneumatic gas return outlet of said separator means to said blower;

said separator means having an inlet for receiving said mixture of pneumatic gas and said particulate matter, a particulate matter outlet for discharging said particulate matter, and a pneumatic gas return outlet for returning said pneumatic gas to said pneumatic conveying means after said particulate matter has been discharged;

a battery for supplying electrical power;

a battery charger connected to and driven by said motor;

an air lock drive motor connected to the battery for receiving power therefrom and connected to and driving the metering means;

means positioned adjacent said metering means for measuring the amount of material dispensed; and portable enclosure means encasing at least said storage means and said metering means.

15. The device of claim 14, further comprising controller means for controlling said motor.

* * * * *